United States Patent [15] 3,655,018
Higuchi et al. [45] Apr. 11, 1972

[54] CLUTCH CONTROL SYSTEM FOR MOTOR VEHICLES

[72] Inventors: Shunichiro Higuchi; Kazunobu Katayose, both of Yokohama, Japan

[73] Assignee: Okamura Manufacturing Company, Limited, Yokohama, Japan

[22] Filed: July 20, 1970

[21] Appl. No.: 56,464

[30] Foreign Application Priority Data

Mar. 25, 1970 Japan.................................45/24429

[52] U.S. Cl..........................................192/4 A, 192/13 R
[51] Int. Cl..........................................F16d 67/02
[58] Field of Search................................192/4 A, 4 R, 13 R

[56] References Cited

UNITED STATES PATENTS

| 2,324,693 | 7/1943 | Griswold et al.......................192/12.2 |
| 2,950,734 | 8/1960 | Hasbury....................................192/13 |
| 3,017,974 | 1/1962 | Lasley......................................192/4 A |

*Primary Examiner*—Benjamin W. Wyche
*Assistant Examiner*—Randall Heald
*Attorney*—Spensley, Horn & Lubitz

[57] ABSTRACT

A clutch control system for motor vehicles which enables the driver to switch the operation of a clutch for forward drive over to a clutch for reverse drive and vice versa in a simple manner, and which permits automatic disengagement of either clutch when the brakes are applied with the particular clutch engaged.

7 Claims, 1 Drawing Figure

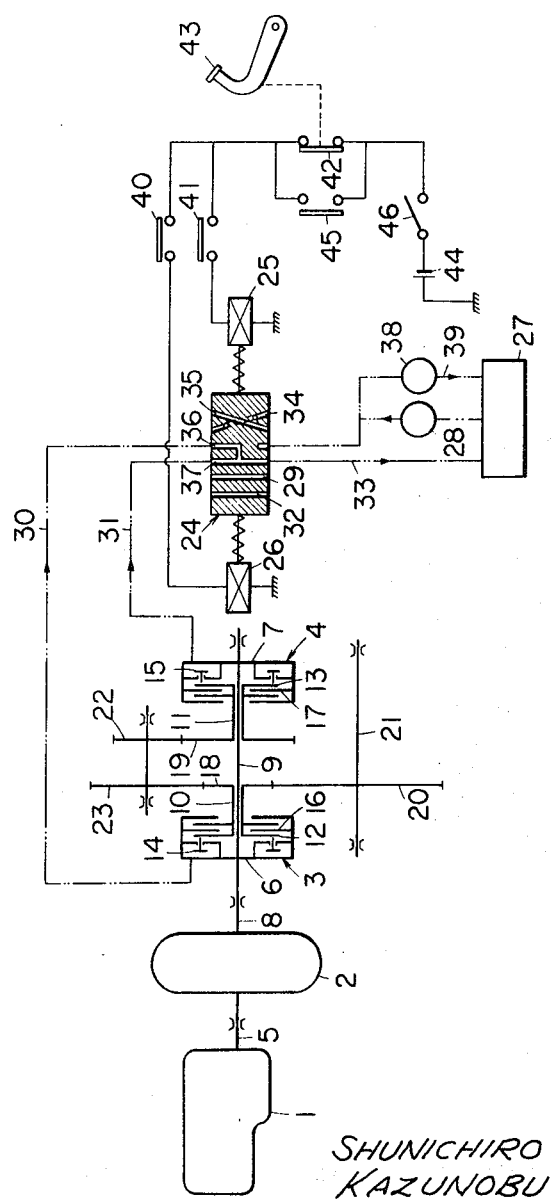

CLUTCH CONTROL SYSTEM FOR MOTOR VEHICLES

This invention relates to a clutch control system for motor vehicles which enables the driver to switch the operation of a clutch for forward drive over to a clutch for reverse drive and vice versa in a simple manner, and more specifically to a clutch control system for motor vehicles which promises to be highly useful when incorporated in vehicles equipped with a fluid coupling such as torque converter and which therefore dispense with any clutch pedal.

Motor vehicles of the type in which power is transmitted through a fluid coupling such as torque converter usually have no clutch pedal. It is also customary and very simple in practice, where there arises the need of cutting off the transmission of power to the wheels in order to apply the brakes to the vehicles for a loading, unloading or other operation, that the power-transmitting clutches are released in response to a pressure applied on the brake pedal.

The conventional system is such that, when the driver depresses the brake pedal, a controller for the forward and rearward clutches is actuated so as to set the clutches to the neutral positions.

However, the system has a disadvantage. In the event when a vehicle equipped with such a system is to start uphill from rest, the driver draws his foot from the brake pedal and depresses the accelerator pedal instead. Then the vehicle moves some distance back against the driver's will. This is caused by a time lag or an uncontrollable period between the moment when the wheels are freed of the braking force and the moment when the clutches are engaged.

In order to eliminate the above disadvantage, it is necessary to make an arrangement so that the clutches are kept in working engagement, where necessary, even when the brake pedal is depressed.

In the case when the vehicle is to be inched forward or backward, disengagement of the clutches independent of the brake pedal manipulation is desired. For example, the driver is sometimes required to engage and disengage the clutches while depressing the foot brake pedal to apply the braking force to the vehicle.

It is a primary object of this invention to provide a clutch control system for vehicles which permits change-over of the clutches for forward and backward drive by simple manipulation.

Another object of the present invention is to provide a clutch control system for vehicles which permits automatic disengagement of the clutch for forward drive or the clutch for reverse drive when the brakes are applied with the particular clutch engaged.

Still another object of the invention is to provide a clutch control system for vehicles which permits engagement of either clutch as desired while applying the braking force to the vehicle.

Yet another object of the invention is to provide a clutch control system for vehicles which enables either clutch to be engaged and disengaged as desired, simply, easily and repeatedly, while suitable braking force is being applied to the vehicle.

A further object of the invention is to provide a clutch control system for vehicles which is particularly advantageous when incorporated in vehicles which are equipped with a fluid coupling such as torque converter and hence are free of clutch pedal.

Other objects and advantages of the present invention will be apparent from the following detailed description taken in conjunction with the accompanying drawing showing an embodiment thereof in a diagrammatic fashion.

In the single FIGURE, the reference numeral 1 indicates an engine, 2 a torque converter, 3 a clutch for reverse drive, and 4 a clutch for forward drive. These components are arranged on the axis of the output shaft 5 of the engine 1. Disk covers 6, 7 of the two clutches 3, 4 are operatively coupled to the output shaft 8 of the torque converter 2 by means of a center shaft 9.

Output shafts 10, 11 of the clutches 3, 4 are tubular shafts, both sleeving the center shaft 8 and being secured at one ends, respectively, to clutch plates 12, 13 accomodated in the disk covers 6, 7.

The disk covers 6, 7 accomodate pressure plates 14, 15, respectively, in such a manner that, when fluid under pressure is pumped into the disk covers 6, 7, the pressure plate 14 or 15 slides in contact with the clutch plate 12 or 13 to press the either clutch plate against either of pressure receiving plates 16, 17 which are inwardly flanged as integral parts of the disks 6 and 7.

To the other ends of the output shafts 10, 11 are secured gears 18, 19, with gear 18 in direct mesh with a large gear 20 on an axle 21 which is a driven shaft, while the other gear 19 is in mesh with the gear 18 through intermediate gears 22, 23.

A control valve 24 is adapted to be moved slidingly rightward or leftward upon energization of either solenoid 25 or 26. The valve, when disposed in the right position, permits the hydraulic fluid from a tank 27 to be introduced by means of a pump 28 into the clutch 3 for reverse drive through a passage 29 and a line 30 and, at the same time, enables the fluid from the clutch 4 for forward drive to come back to the tank 27 via a line 31, a passage 32 and a line 33. When the valve is in the left position, the fluid from the tank 27 is left into the clutch 4 for forward drive through a passage 34 and the line 31 and the fluid from the clutch 3 for reverse drive is brought back into the tank 27 via the line 30, a passage 35 and the line 33. When both of the solenoids 25, 26 are deenergized, the control valve 24 is automatically reset to the center, or the neutral position, so that the fluid in the both clutches 3, 4 is brought back into the bank 27 via the lines 30, 31, passages 36, 37 and the line 33 and also the fluid from the pump 28 is led back to the tank 27 by way of a relief valve 38 and a line 39.

Limit switches 40, 41 are provided for shutting off the supply of power to the solenoids 25, 26 for the forward and reverse drive, respectively. They are so designed that, when a change lever not shown is shifted to the position for change-over to the forward drive or reverse drive, the lever partly contacts with either switch to close the same.

A limit switch 42, which is associated with the foot brake pedal 43 in such a way that it is opened as the pedal is depressed to a certain extent, is connected in series between the two limit switches 40, 41 and an electric power source 44.

Indicated at 45 is a push button switch which is connected in parallel with the limit switch 42 and attached to a part of the change lever (not shown).

A key switch 46 is interposed between the power source 44 and the two switches 42, 45.

With the construction above described, the system according to this invention is operated in the manner now to be described. As the key switch 46 is turned on thereby starting the engine 1 by means of a starting motor and as the change lever is shifted to the forward position without depressing the brake pedal 43, the limit switch 40 is turned on to the solenoid 26, which in turn causes leftward sliding of the control valve 24. Then, in the manner already described, hydraulic oil is supplied to the clutch 4 for forward drive, thus causing the rotation of the axle 21 in the forward direction.

Conversely if the change lever is shifted to the reverse position, the limit switch 41 excites the solenoid 25 thereby to cause rightward sliding of the control valve 24. As a result, the clutch 3 for reverse drive is engaged for the rotation of the axle 21 in the backward direction.

Next, if the brake pedal 43 is depressed while the change lever is set in the forward or reverse position, the limit switch 42 is turned off and power supply to the solenoids 25, 26 is cut off. This in turn brings the control valve 24 back to the neutral position and disengages both of the forward and reverse clutches 4, 3, and the rotation of the engine 1 is no longer transmitted to the axle 21.

When starting uphill from rest, the driver has only to press the push button switch 45 on the change lever by a finger tip and shift the change lever to the forward position, while depressing the brake pedal 43 thereby applying the brakes to the vessel. In this case the limit switch 42 is kept off by the brake pedal 43 but the push button switch 45 in parallel connection therewith is in the on position and the limit switch 40 for forward drive is kept on. The clutch 4 for forward drive is thus in an operatively engaged state. Therefore, if in this state the accelerator is increasingly depressed thereby raising the speed of the engine 1 and the brake pedal 43 is released, the vehicle will smoothly and positively start uphill from rest, without any backward movement contrary to the driver's intention.

Where inching of the vehicle is desired, it can be simply and easily performed by repeated manipulation of the push button switch 45 with suitable depression of the brake pedal 43.

The foregoing description has been made in conjunction with a mere embodiment thereof, and it is to be understood that this invention is not limited therebo but various modifications are of course possible without departing from the spirit and scope of this invention. For example, the torque converter 2 may be supplanted by any other fluid or nonfluid type transmission, or the hydraulic clutches 3, 4 may be replaced by mechanical, pneumatic or electromagnetic ones. The operation of the limit switch 42 may be interlocked with that of some suitable element associated with the movement of the master cylinder, the oil pressure thereby exerted, flashing of the brake lamp, or the operation of the brakes, instead of the operation of the foot brake pedal 43 itself as described above. Hydraulic or pneumatic valves may be used in lieu of the solenoid valves 25, 26. Further, the change lever may be replaced by a manipulation button or buttons.

Detailed description of such replacement of the constituent factors and redesigning of the associated parts is omitted because they can be performed without difficulty by those skilled in the art.

It is also to be appreciated that in the practice of this invention the clutches 3, 4, control valve 24 and other switches are in no way limited to any special types.

We claim:

1. A clutch control system for motor vehicles further having a braking system comprising:
    an electric power source;
    first and second clutches, each responsive to an electrical signal to provide forward and reverse drives to said vehicle;
    first and second switches coupled to said first and second clutches respectively, said first and second switches being operative to cause engagement of said first and second clutches respectively upon the actuation thereof when coupled to said power source; and,
    a third switch coupled to said braking system, said first and second switches being coupled to said power source through said third switch whereby said third switch is actuated by the operation of said braking system to prevent engagement of either of said first and second clutches upon the actuation of either of said first and second switches.

2. The clutch control system of claim 1 further comprised of a fourth switch, said fourth switch being coupled in parallel with said third switch and selectively operative to allow engagement of said first and second clutches irrespective of the actuation of said braking system.

3. The clutch control system of claim 1 for vehicles having a change lever movable between forward and reverse positions, wherein said first switch is disposed so as to be contacted and actuated by said lever when moved to said forward position and said second switch is disposed so as to be contacted and actuated by said lever when moved to said reverse position.

4. The clutch control system of claim 1 for use in vehicles having a braking system actuated by a foot brake pedal, wherein said third switch is coupled to said pedal and is actuated by the depression of said pedal.

5. The clutch control system of claim 1 wherein said first and second clutches comprise first and second clutch units each engageable by supplying hydraulic fluid thereto, means for supplying hydraulic fluid, a control valve, and first and second solenoids, said control valve being hydraulically coupled to said means for supplying hydraulic fluid and to said first and second clutch units and having a control member movable between a first position to direct hydraulic fluid to said first clutch unit and a second position to direct hydraulic fluid to said second clutch unit, said first solenoid being coupled to said first switch and to said control member and operative to move said control member to said first position when said first switch is actuated, said second solenoid being coupled to said second switch and to said control member and operative to move said control member to said second position when said second switch is actuated.

6. The clutch control system of claim 1 further comprised of a torque converter having an input shaft and an output shaft, said input shaft being coupled to the drive engine of said motor vehicle, said output shaft being coupled to said first and second clutches.

7. The clutch control system of claim 3 further comprised of a fourth switch, said fourth switch being a push button switch mounted on said change lever and being coupled in parallel with said third switch so as to be selectively operative to allow engagement of said first and second clutches irrespective of the actuation of said braking system.

* * * * *